Dec. 27, 1960  E. H. BLATTNER  2,966,321
SNUBBED STRUT
Filed Oct. 21, 1954
2 Sheets-Sheet 1
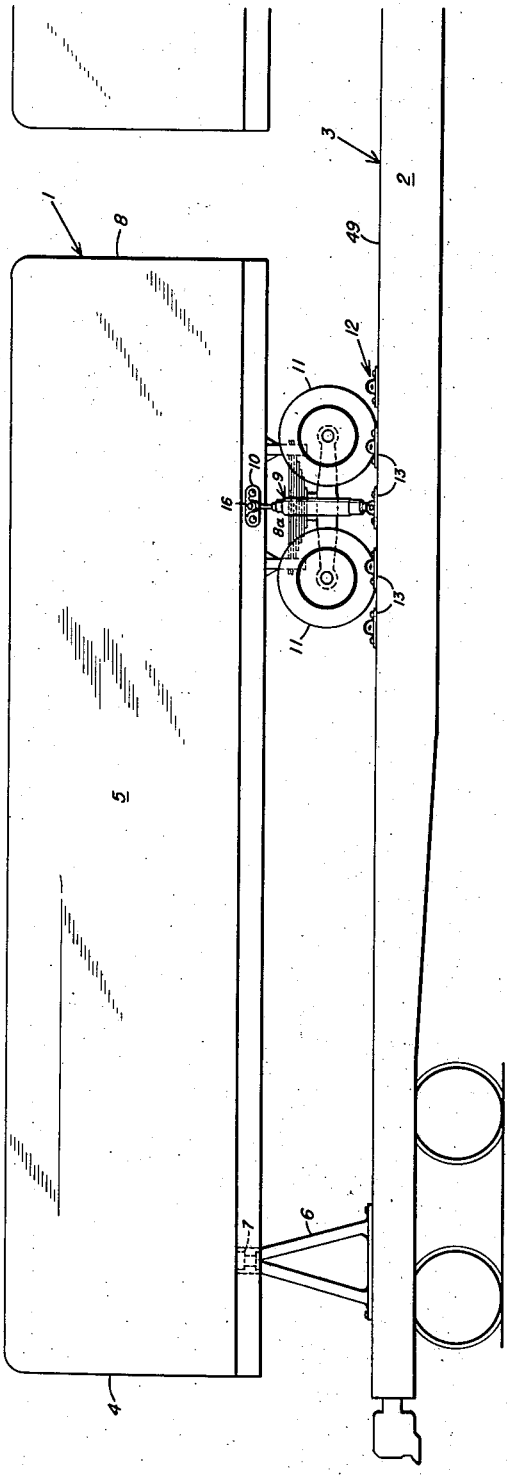
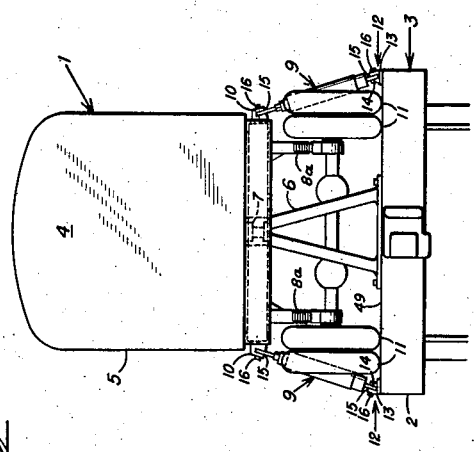
Inventor:
Emil H. Blattner
By Wilmer Mechlin
his Attorney Dec. 27, 1960
E. H. BLATTNER
2,966,321
SNUBBED STRUT
Filed Oct. 21, 1954
2 Sheets-Sheet 2
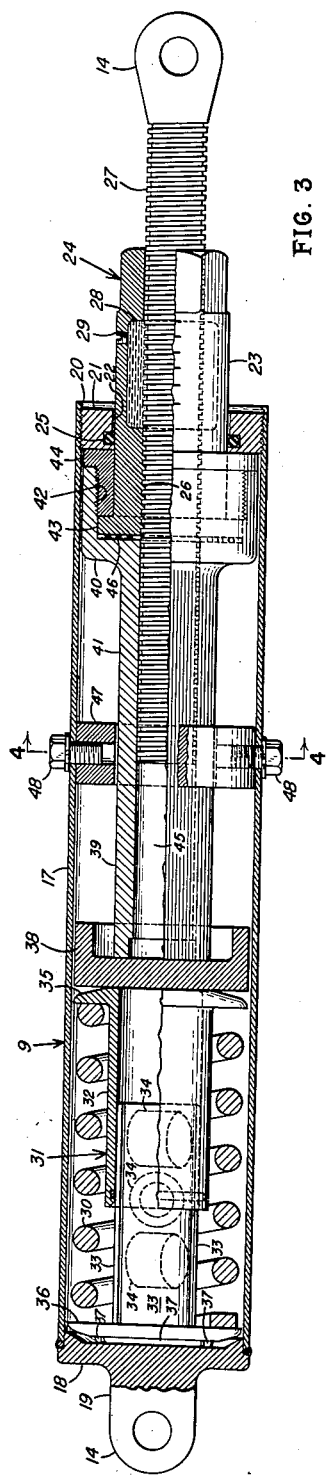
Inventor:
Emil H. Blattner
By Wilmer Mechlin
his Attorney

United States Patent Office 2,966,321
Patented Dec. 27, 1960

2,966,321

SNUBBED STRUT

Emil H. Blattner, Williamsville, N.Y., assignor to Symington Wayne Corporation, a corporation of Maryland Filed Oct. 21, 1954, Ser. No. 463,660

10 Claims. (Cl. 248—119)

This invention relates generally to railway vehicles and more particularly to snubbed struts for securing lading thereto.

With the emphasis now being given in freight transportation to so-called "piggybacking" in which highway trailers are carried on flat cars, it has become of prime importance to provide means for securing the trailers against shifting during transit. Since the trailers are not uniform either in length or in the height of their bodies above ground, the securing means to be satisfactory must obviously be adjustable in these two respects and must also be readily applied and removed to achieve a main objective of piggybacking service, rapidity of transport from source to destination.

Securing of the front end of a trailer is relatively simple, the king-pin through which it is normally coupled to a truck or tractor serving as a ready means for anchoring that end of the trailer to a supporting stand of adjustable height fixed or resiliently mounted on the flat car. Securing of the rear end of the trailer presents a different problem, since it is spring-supported on its wheels and therefore will bounce on its springs under shocks to which the platform of the flat car is subjected in service. A number of solutions have been proposed for this problem; one contemplating securing of one of the rear axles, another chocking of the wheels, and another, securing of the trailer body to the car platform by adjustable yieldable struts. Securing means of the last type appear to offer the most promise since they are capable of resisting both vertical and horizontal motion, and it is to an improvement in such struts that the present invention is directed.

An object of the invention is to provide an arrangement for securing a trailer and like spring-supported body to a freight car, wherein the trailer body is secured by snubbed struts which are adjustable in length and selectively connectable to the flat car so as to accommodate variations in length and road clearance of such bodies and when connected will cushion part or all of the forces tending to move the trailer body relative to the flat car.

Another object of the present invention is to provide an improved adjustable strut for securing trailers and other lading to railway vehicles, which limits movement of the trailer relative to the railway vehicle and by forceabsorbing cushioning means, cushions or snubs at least part of the forces responsible for such movement.

A further object of the invention is to provide a snubbed strut for securing lading to a railway vehicle which may be adjusted in length when in lading-securing position to act either as a hold-down means or as a resilient support for the lading up to the load limit of its resilient means and thereafter will limit movement of the lading relative to the vehicle under external forces and, depending on the form of the strut, will either partially or completely cushion such relative movement.

Other objects and advantages of the invention will appear hereinafter in the detailed description, be particularly pointed out in the appended claims, and be illustrated in the accompanying drawings, in which:

Figure 1 is a fragmentary side elevational view, somewhat schematic, showing the rear portion of a trailer body secured to a flat car by a preferred form of the strut arrangement of the present invention.

Figure 2 is an end elevational view of the structure of Figure 1.

Figure 3 is a longitudinal sectional view of one embodiment of the snubbed strut of the present invention.

Figure 4 is a transverse sectional view taken along the lines 4—4 of Figure 3.

Figure 5 is a longitudinal sectional view of a second embodiment of the strut of the present invention.

Figure 6 is a transverse sectional view taken along the lines 6—6 of Figure 5; and Figure 7 is an exploded isometric view of a modified form of the wedge and one of the companion friction shoes for the strut of Figure 5.

Referring now in detail to the drawings, in which like reference characters designate like parts, the securing or hold-down arrangement of the present invention, while of wide application in securing or connecting lading to railway vehicles, is particularly designed for securing the rear portion of a high-trailer body to a flat car and has been so illustrated. The trailer, designated as 1, may be side- or end-loaded and unloaded, depending on the available handling facilities. When loaded on the body 2 of the flat car 3 the trailer will have the front end portion 4 of its body 5 removably anchored to the flat car through suitable means, such as a support or stand 6 of adjustable height, yieldably or rigidly mounted on the body and adapted to accommodate and interlock with the king-pin 7 of the trailer.

In accordance with the present invention the rear or spring-supported portion 8 of the trailer body 5 is secured or connected to the body 2 of the flat car 3 by one or more snubbed struts 9, one preferably being applied to each side of the trailer body. The struts, as their name implies, preferably serve as supports at least partially to relieve the trailer's supporting springs 8a of their load, but may be employed as hold-down means when circumstances require that the trailer body be substantially rigid with the body of the flat car. The upper end of each strut is connected to the trailer body by a bracket or connector 10 suitably fixed to the body, the brackets in the illustrated embodiment being mounted on either side of the trailer body above its wheels 11, and being either attached to the underside of the body or, as shown, inset in its sides to avoid interference in the normal operation of the trailer. It is intended that the securing arrangement be adapted to accommodate trailers of varying length and to this end a set 12 of connecting brackets is provided on the flat car body for each of the trailer body brackets 10, each set comprising a plurality of longitudinally spaced car body brackets 13. As shown, the brackets 12 are so spaced transversely of the car as to clear the wheels 11 of the trailer 1 and to cause the snubbers to be inclined and diverge transversely towards their upper or, and preferably, their lower ends, so as to resist horizontal or transverse as well as vertical movement of the trailer body.

The particular form of connecting bracket employed will depend upon the end construction of the struts 9. In the form shown, in which each end of the strut is a flattened eye 14, the several brackets 10 and 13 are round-nosed and slotted or bifurcated to receive the eyes, the slots 15 being inclined in correspondence with the divergence of the struts and being of such configuration as to permit limited swinging of the struts about the connecting pins 16 both longitudinally and transversely of the trailer car bodies.

The snubbed strut 9 of the present invention is exemplified by the embodiments illustrated in Figures 3 and 5. As will become apparent, both embodiments are capable of serving as load supports up to the capacity of their resilient means or as hold-down members. Both, when acting as supports, are yieldable in either axial direction to permit limited movement of the lading relative to the flat car or other railway vehicle, the strut of Figure 3 cushioning such yielding in one direction, while in that of Figure 5 cushioning is obtained in both directions. If, as in the illustrated embodiments, the yieldable means is a coil spring which is subject to periodicity in oscillation, the snubbing or dampening means will generally be of the friction type and it is such snubbing means that each of the embodiments incorporates.

Referring particularly to the embodiment of Figure 3, the snubbed strut 9 there shown is comprised of a tubular housing or casing 17 open at one end and closed at the other by a cover or end plate 18 fixed thereto, as by welding, and carrying as an integral part outwardly of the casing 17, a lug 19 in which is formed the aforementioned flattened eye 14. Threaded into the other or open end 20 of the casing is a plug or collar 21 having an axial bore 22 for slidably receiving the stem 23 of an adjusting nut 24, the bore being packed by an O ring 25 carried by the plug to prevent the entrance of dirt or other foreign matter into the casing. The adjusting nut 24, in turn, has an axial bore 26, in this case internally threaded to receive a threaded eye bolt 27 carrying at its outer end the other of the flattened eyes 14. With its two ends held against rotation by the associated of the brackets 10 and 13, the strut 9 is readily adjusted in length to accommodate any variations in height of the trailer bodies above the ground by rotation of the adjusting nut 24, the nut to ensure ease of rotation having a lubricant-retaining reservoir 28 encircling the eye bolt 27 and fillable through a frusto-conical plug 29.

Although the setting of the adjusting nut 24 determines the maximum length in this embodiment, the snubbed strut is made further compressible against yieldable resistance by yieldable means, in the form of a coil spring 30 contained within the casing 17, the coil spring 30 here forming a part of a cushioning unit 31 such as illustrated in my copending application, Serial No. 376,124, filed August 24, 1953. As shown, the cushioning unit 31 is comprised, in addition to the spring 30, of a cylindrical barrel 32 in which are telescopingly received a plurality of counterpart friction shoes 33, the latter being urged laterally into frictional engagement with the barrel by a plurality of transversely acting springs 34. The spring 30 encircles both the barrel 32 and the shoes 33 and acts to urge them apart through an outstanding annular flange 35 formed integrally with the barrel and a ring 36 collaring the shoes, the ring being held for axial movement with the shoes and applying leverage to urge them outwardly through outturned feet or flanges 37 on the latter.

Bearing at one end against the cover-closed end of the casing 17, the cushioning unit 31 has any compressive forces applied to the eye bolt 27 and adjusting nut 24 transmitted to it through a follower plate 38 against which its other end bears. These forces in turn are transmitted to the follower plate 38 through a column, post or plunger 39 having a socketed head 40 at its outer end for receiving the inner end of the adjusting nut 24 and a tubular shank 41 of reduced hexagonal cross-section which bears at its inner end against the follower plate. For holding the adjusting nut in the socket or seat 42 in the column 39 and locking its members against relative axial movement, the inner end of the adjusting nut is formed as an outturned annular lip 43 against the outer face of which bears a locking ring 44, the locking ring being externally threaded for threaded engagement with the internally threaded outer portion of the socket 42.

It will be noted that the column 39 has an interior cylindrical passage 45 for receiving the inner end of the eye bolt 27 during maximum penetration of the latter within the casing. So that the adjusting nut 24 will rotate freely relative to the column 39 during adjustment, the locking ring 44 is shouldered to abut against the outer end of the column 39, thus limiting its penetration into the socket 42, and anti-friction bearings 46 are interposed between the confronting ends of the adjusting nut and socket.

Adjustable in length by rotation of the adjusting nut 24 and over a wide range by the provision in the column 39 of the cylindrical passage 45 in which the inner end of the eye bolt 27 is slidably receivable, the strut of the embodiment also has means in the form of a guide ring or collar 47 of hexagonal inner cross-section, which encircles the hexagonal shank 41 of the column 39 and is fixed within the casing 17, as by cap screws 48, for guiding the column during its movement axially of the casing.

When applied for securing the trailer 1 to the flat car 3 the strut 9 initially will be adjusted in length, as necessary, to permit its connection to the trailer body bracket 10 on one side of the trailer and the associated car body brackets 13 appropriate to the length of the trailer. If, as will usually be the case, the strut is to serve as a resilient support for the trailer body 2, the adjusting nut 24 will then be turned (clockwise in the illustrated embodiment) to extend or push out the threaded eye bolt 27. As the eye bolt is extended, part of the weight of the trailer body is shifted to the strut. This, in turn, forces the adjusting nut 24 and plunger 39 inwardly, the latter, through the follower 38, gradually compressing the spring 30. This adjustment is continued until the desired load has been imposed on the spring 30 and, through the spring, is resiliently supported by the strut. In process, the locking ring 44 is moved correspondingly inwardly from the plug 21. Thereafter, when the trailer body is subjected to forces tending to move it relative to the flat car, such forces will act axially on the strut. If the forces exert a pull or tension on the strut, the latter will yield and extend freely up to the limit of the spacing between the locking ring 44 and plug 21, the engagement of these members providing a positive stop for determining the maximum movement of the body under such forces. If, on the other hand, the forces exert a push or compression on the strut, they will be yieldably resisted by the spring 30 and be partially absorbed by the friction engendered between the barrel 32 and shoes 33 of the cushioning unit 31, thus dampening or snubbing the recoil of the spring and cushioning and reducing the resultant of the forces on the trailer body.

The embodiment appearing in Figure 5 is illustrative of a snubbed strut which is not only extendable and contractable after adjustment but cushions movement in either axial direction, thus enabling the spring suspension of the flat car, that of the trailer and the snubbers to act jointly in cushioning road shocks for maximum protection of the goods with which the trailer is loaded. In the form shown, the snubbed strut of this embodiment is comprised of a tubular casing or housing 50 closed at one end by a dome-shaped cover or closure member 51 welded to the casing and carrying outwardly thereof a lug 52 in which is formed one of the flattened eyes 14. The other or open end 53 of the casing is internally threaded to receive an externally threaded cylindrical plug or collar 54, which, after being screwed into the casing, may be held against rotation by a set screw 55. This plug is axially bored to slidably receive a sleeve 56 encircling an adjusting nut 57, the latter, as in the case of the first embodiment, being internally threaded to receive an externally threaded eye bolt 58.

The purpose of the sleeve 56 is to enable the adjusting nut to be interlocked for axial movement with a hollow column, post or plunger 59, so that on movement of the nut in either axial direction, force will be transmitted through the column to the cushioning mechanism hereafter to be described. At the same time the adjusting nut 57 is designed to be rotatable relative to the column 59, as was that of the first embodiment. Such axial movement in unison and relative rotation of these members is here obtained by threading of the sleeve 56 inwardly or rearwardly of its socket 60 in which is contained or accommodated an outturned annular lip 61 on the adjusting nut 57, to receive an externally threaded ring 62 which, in turn, receives the outer end of the column 59. Fixed to the column 59, as by welding, the ring 62 may be fixed against rotation relative to the sleeve 56 by a set screw 63. It is then only necessary to interpose antifriction means, such as the illustrated ball bearings 64, between the confronting ends of the adjusting nut 57 and ring 62 and to form in the adjusting nut about the eye bolt 58 a lubricant-containing cavity 65, to ensure that the adjusting nut will rotate freely at all times for adjusting the length of the strut.

The cushioning mechanism of this embodiment, designated generally as 66, which enables the strut to both expand and contract against yieldable resistance after adjustment, is contained within the casing 50 and has as its yieldable means a coil spring 67 encircling the column 59 and bearing at either end against an annular wedge 68, also encircling the column. Each of these wedges 68, outwardly of the spring 67, may have a convex frusto-conical wedging face 69 which bears against and frictionally engages a concave friction surface 70 of corresponding configuration on each of a plurality of friction shoes or elements 71. However, to ensure that the shoes of each set maintain their relative positions about the associated wedge, it is preferred that the wedges and shoes be of the form shown in Figure 7 in which each of the annular wedges has a plurality of circumferentially spaced flat wedging faces 69a, each frictionally engaging a corresponding flat friction surface 70a on one of the shoes 71. Under action of the wedges 68, the shoes 71 are urged outwardly, radially of the casing 50 into frictional engagement with the casing's cylindrical inner wall 72, the shoes for engendering maximum friction having cylindrical peripheries 73 coradial with the wall.

Encircling and slidable on the column 59, inwardly of the inner of the shoes 71, is a ring-shaped inner or rear follower 74 which may be held on the column by a nut 75, the latter, in turn, being locked to the column, as by tack-welding. Slidably encircling the column 59 and bearing against the outer ends of the outer of the friction shoes 71, is an outer or front follower 76, which in the normal or at rest position of the strut, also abuts or bears against the inner end of the plug 54. In the outer follower is an outwardly facing cylindrical socket or pocket 77 of sufficient depth to accommodate the sleeve 56 and associated structure and enable the sleeve 56 to slidably engage and be guided by the plug 54 throughout the range of yieldable extension of the strut. It will be noted that, as in the first embodiment, packing in the form of an O ring 79 is carried by the plug 54 to seal the interior of the strut against dirt or other foreign matter. The action of the plug 54 as an abutment or stop for the outer follower 76, is duplicated for the inner follower 74 by the confronting end 80 of the cover 51, the dome-shaped cavity 81 of the latter being of sufficient depth to accommodate the nut-carrying inner end of the column 59 over the range of yieldable contraction of the strut.

With the outer follower 76 at one end and the inner follower at the other, the cushioning mechanism 66 is enabled to act in either direction so as to cushion the strut on both extension and contraction. On extension or expansion of the strut the outer follower 76 and outer of the friction shoes 71 and wedges 68 are held against movement by the plug 54. The inner follower 74, however, is picked up by the column through the nut 75 and carried outwardly, carrying with it the inner of the friction shoes 71 and wedges 68. Fixed at one end, the spring 67 resists this movement and at the same time forces the inner of the friction shoes 71 against the inner wall of the casing 50, thus both yieldably resisting and cushioning movement. On contraction, the cushioning mechanism acts in reverse, the inner follower 74 and inner of the friction shoes 71 and wedges 68 then being fixed relative to the casing 50, and friction being engendered with the casing by the outer of the shoes 71.

Unlike the strut of Figure 3, that of this embodiment has no positive stop for limiting its extension under tension and thus can act as a hold-down means only by rotating the adjusting nut 57 to draw the eye bolt 58 in to the point at which the spring 67 is substantially solid. The strut of the second embodiment, with its ability, so long as its spring 67 is not compressed to the full limit, to cushion both tensile and compressive forces, i.e. forces acting on it in both axial directions, accordingly, is most effective as a load-support. Made to function as such a support by adjusting the adjusting nut 57 to increase the length of the strut while it is in lading-securing position, the strut then resiliently or yieldably supports the load imposed on it by the trailer body 5 and cushions any forces tending to move the body relative to the deck 49 of the flat car 2.

While the snubbed strut of the second embodiment has the advantage over that of the first of yieldably resisting forces acting to vary its length in either direction, thus taking full advantage of the longitudinal and transverse movability of its ends relative to the brackets 10 and 13 and cushioning movement of the rear end of the trailer body 2 in any direction under road shocks, both embodiments are effective to secure the rear end 8 of the trailer to the flat car 3 and are more effective than the unsnubbed adjustable struts heretofore proposed for this purpose. It should be understood that the described and disclosed embodiments are merely exemplary of the invention and that all modifications are intended to be included which do not depart from either the spirit of the invention or the scope of the appended claims.

Having described my invention, I claim:

1. An arrangement for securing the spring-supported end of a trailer to a flat car comprising a pair of transversely spaced brackets on the rear portion of the body of said trailer, a pair of transversely spaced sets of brackets on said flat car and each comprising a plurality of longitudinally spaced brackets for selective connection to one of said trailer brackets, a strut for connecting each of said trailer brackets to the selected flat car bracket and connectable thereto for relative swinging in a plurality of directions, said struts being adjustable in length for varying the distribution of the load of said trailer end between the supporting springs thereof and said struts and after adjustment being variable in length in both directions under forces tending to move said trailer body relative to said flat car, and cushioning means incorporated in said struts for yieldably resisting and partially absorbing forces acting to vary the length thereof in at least one of said directions.

2. An arrangement for securing the spring-supported end of a trailer to a flat car comprising a pair of transversely spaced brackets on the rear portion of the body of said trailer, a pair of transversely spaced sets of brackets on said flat car and each comprising a plurality of longitudinally spaced brackets for selective connection to one of said trailer brackets, a strut for connecting each of said trailer brackets to the selected flat car bracket and connectable thereto for relative swinging in a plurality of directions, said struts being adjustable in length for varying the distribution of the load of said trailer end between the supporting springs thereof and said struts and after adjustment being variable in length in both directions under forces tending to move said trailer body relative to said flat car, and cushioning means incorporated in said struts for yieldably resisting and partially absorbing said forces.

3. A snubbed strut for securing lading to a railway vehicle comprising a casing, cushioning means in said casing, connecting means movably connected to and projecting from an end of said casing, column means in and shiftable axially of said casing for transmitting force in at least one direction from said connecting means to said cushioning means, and adjusting means in and slidable axially of said casing and rotatable relative thereto independently of said column means, said adjusting means being actuatable exteriorly of said casing and acting on said connecting means for adjusting the length of said strut in a lading-securing position thereof.

4. An arrangement for securing the spring-supported end of a trailer to a flat car comprising bracket means on the body of said trailer, cooperating bracket means on said flat car, strut means connectable to said bracket means for securing said trailer body to said flat car, said strut means being adjustable in length for varying the distribution of the load between said strut means and the supporting springs of said trailer and thereafter being yieldably variable in length under forces tending to move said trailer body relative to said flat car, and means incorporated in said strut for cushioning and reducing the resultant on said trailer body of said forces.

5. An arrangement for securing the spring-supported end of a trailer to a flat car comprising a pair of transversely spaced brackets on the rear portion of the body of said trailer, a pair of transversely spaced sets of brackets on said flat car and each comprising a plurality of longitudinally spaced brackets for selective connection to one of said trailer brackets, and a strut for connecting each of said trailer brackets to the selected flat car bracket, said struts being adjustable in length for varying the load imposed by said trailer body on the supporting springs of said trailer and being yieldably variable in length after adjustment under forces tending to move said trailer body relative to said flat car, and means incorporated in said struts for partially absorbing said forces and reducing the resultant thereof on said trailer body.

6. A snubbed strut for securing lading to a railway vehicle comprising a casing, connecting means projecting beyond each end of said casing, one of said connecting means being secured to said casing, a threaded bolt formed integrally with said connecting means, an adjusting nut threadedly receiving said bolt and slidable axially in said casing, friction and spring means in said casing, means in said casing independent of said bolt for transmitting from said adjusting nut to said friction and spring means forces tending to vary the spacing between said connecting means, said adjusting nut being rotatable in said casing independently of said force transmitting means and projecting from said casing for adjusting externally thereof the spacing between said connecting means, and anti-friction means between said adjusting nut and said force transmitting means and bolt for reducing the resistance to rotation of said adjusting nut relative thereto.

7. A snubbed strut for securing lading to a railway vehicle comprising a casing closed at one end, a cushioning unit in and bearing against said closed end of said casing, a threaded bolt projecting from the other end of said casing, an adjusting nut in and slidable axially of said casing and threadedly engaging said bolt for varying the length of said strut, said nut projecting from and being actuatable externally of said casing, and plunger means slidably associated with said bolt, said plunger means acting between and outer end of said cushioning unit and said nut for compressing said unit in response to forces on said nut tending to shorten said length, and said adjusting nut being rotatable in said casing independently of said plunger means for varying the free length of said strut without affecting said cushioning unit.

8. A snubbed strut for securing lading to a railway vehicle comprising a casing closed at one end, a threaded bolt extending into the open end of said casing, connecting means carried by said casing and bolt at opposite ends of said strut, an adjusting nut on said bolt and rotatable and axially slidable in said casing for adjusting the length of said strut, plug means removably seated in said open end of said casing and slidably encircling said adjusting nut for limiting movement thereof outwardly of said casing, column means within said casing and projecting towards the closed end thereof, said column means slidably receiving said bolt and being connected for axial movement with said adjusting nut, guide means in said casing for guiding said column means in said axial movement, and a spring and friction cushioning unit in said casing between said closed end thereof and said column means and acting through said column means for cushioning inward movement of said adjusting nut relative to said casing.

9. A snubbed strut for securing lading to a railway vehicle comprising a casing closed at an inner end, a threaded bolt extending into the outer end of said casing, an adjusting nut threadedly engaging said bolt and rotatable and slidable axially in said casing for adjusting the length of said strut, column means in said casing, said adjusting nut being rotatable independently of and fixed for axial movement with said column means, spring means encircling said column intermediate ends thereof, spaced wedge means slidably encircling said column at each end of said spring means, inner and outer followers slidably encircling said column respectively inwardly and outwardly of said wedge means, and abutments secured to said casing and embracing and each engageable with one of said followers for limiting movement thereof in one direction and through said spring and wedge means cushioning movement of said adjusting means in either direction axially of said casing in response to forces tending to vary the length of said strut.

10. A snubbed strut for securing lading to a railway vehicle comprising a tubular casing closed at an inner end, a threaded bolt extending into the outer end of said casing, an adjusting nut threadedly engaging said bolt and rotatable and slidable axially in said casing for adjusting the length of said strut, a cushioning unit in said casing inwardly of said adjusting nut, said cushioning unit including a spring, a wedge at each end of said spring, a set of counterport friction shoes frictionally engaging each of said wedges and urgeable radially thereby into frictional engagement with the inner wall of said casing, outer and inner followers spaced axially of said casing and disposed at opposite ends of said unit, a column extending through said cushioning unit, said adjusting nut being rotatable independently of and movable axially with said column means secured to an inner end of said column for moving said rear follower outwardly therewith, and abutment means secured to said casing outwardly and inwardly of said followers for containing said cushioning unit and through engagement with said followers causing said unit to cushion movement of said adjusting nut in either direction axially of said casing in response to forces tending to vary the length of said strut.

References Cited in the file of this patent

UNITED STATES PATENTS

| | | |
|---|---|---|
| 1,854,982 | Chalmers | Apr. 19, 1932 |
| 1,973,079 | Johnson | Sept. 11, 1934 |
| 1,984,565 | Bell | Dec. 18, 1934 |
| 2,099,288 | Allen | Nov. 16, 1937 |
| 2,118,364 | Sheehan | May 24, 1938 |
| 2,128,667 | Atherton | Aug. 30, 1938 |
| 2,233,396 | Blattner | Mar. 4, 1941 |
| 2,420,276 | Wood | May 6, 1947 |
| 2,497,829 | Baselt | Feb. 14, 1950 |
| 2,705,634 | Sampson et al. | Apr. 5, 1955 |

FOREIGN PATENTS

| | | |
|---|---|---|
| 456,359 | Germany | Feb. 21, 1928 |
| 535,859 | Great Britain | Apr. 24, 1941 |
| 848,401 | Germany | Sept. 4, 1952 |